(12) United States Patent
Takeuchi et al.

(10) Patent No.: US 8,909,464 B2
(45) Date of Patent: Dec. 9, 2014

(54) DRIVING EVALUATION SYSTEM AND VEHICLE-MOUNTED DEVICE

(75) Inventors: Shojiro Takeuchi, Tokyo (JP); Satomi Yoshioka, Yokohama (JP); Yoshihiro Ooe, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 85 days.

(21) Appl. No.: 13/879,161

(22) PCT Filed: Oct. 11, 2011

(86) PCT No.: PCT/JP2011/073346
§ 371 (c)(1),
(2), (4) Date: Jun. 24, 2013

(87) PCT Pub. No.: WO2012/050091
PCT Pub. Date: Apr. 19, 2012

(65) Prior Publication Data
US 2013/0288206 A1    Oct. 31, 2013

(30) Foreign Application Priority Data
Oct. 12, 2010 (JP) ................................ P2010-229699

(51) Int. Cl.
G09B 19/16    (2006.01)
G08G 1/01    (2006.01)
G01C 21/34    (2006.01)
G01C 21/36    (2006.01)

(52) U.S. Cl.
CPC ............ G09B 19/167 (2013.01); G08G 1/0112 (2013.01); G01C 21/3469 (2013.01); G01C 21/3697 (2013.01)
USPC .............................. 701/123; 701/36; 702/182

(58) Field of Classification Search
USPC .......... 701/36, 32.8, 123, 412, 454, 468, 532; 702/182–185, 188
See application file for complete search history.

(56) References Cited

U.S. PATENT DOCUMENTS

| 7,130,766 | B2 * | 10/2006 | Tanase .......................... 702/182 |
| 2005/0143876 | A1 | 6/2005 | Tanase |
| 2012/0209453 | A1 | 8/2012 | Sekiyama et al. |

FOREIGN PATENT DOCUMENTS

| JP | 2002350152 | 12/2002 |
| JP | 2004 251786 | 9/2004 |
| JP | 2005 16443 | 1/2005 |
| JP | 2010 276415 | 12/2010 |
| JP | 2011 81743 | 4/2011 |

OTHER PUBLICATIONS

International Search Report Issued Jan. 10, 2012 in PCT/JP11/73346 filed Oct. 11, 2011.

* cited by examiner

Primary Examiner — Richard Camby
(74) Attorney, Agent, or Firm — Oblon, Spivak, McClelland, Maier & Neustadt, L.L.P.

(57) ABSTRACT

A driving evaluation system that divides a traveling route of a vehicle into a plurality of sections and evaluates the driving of a driver of the vehicle includes: a driving data acquiring unit that acquires driving data of the driver for each section; a determining unit that determines whether the driving data acquired by the driving data acquiring unit satisfies the evaluation conditions set to each section; and an upload unit that uploads the driving data to a center which evaluates driving when the determining unit determines that the driving data satisfies the evaluation conditions.

6 Claims, 11 Drawing Sheets

Fig.4

| TRAVELING ROUTE START | A → | B → | C → | D → | E → END |
|---|---|---|---|---|---|
| FIRST TRAVELING | 18 | 15 | 16 | 20 | 14 |
| SECOND TRAVELING | 18 | 18 | 18 | 20 | 15 |
| THIRD TRAVELING | 18 | 15 | 18 | 20 | 14 |
| ⋮ | | | | | |
| n-TH TRAVELING | 18 | 15 | 18 | 20 | 14 |
| REFERENCE DATA | 18 | 15 | 18 | 20 | 14 |

(a)

(b)

DRIVING EVALUATION SYSTEM AND VEHICLE-MOUNTED DEVICE

TECHNICAL FIELD

The present invention relates to a driving evaluation system that evaluates the driving of a driver of a vehicle and an in-vehicle device.

BACKGROUND ART

For example, Japanese Patent Application No. 2009-235625 discloses a driving evaluation system. In the driving evaluation system, driving data is transmitted from an in-vehicle device of a vehicle to an information management center and the center analyzes the driving data and evaluates eco-driving.

CITATION LIST

Patent Literature

[Patent Literature 1] Japanese Patent Application No. 2009-235625

SUMMARY OF INVENTION

Technical Problem

However, when the driving data for the entire traveling section of the vehicle is uploaded to the center, the amount of communication data increases. Therefore, the communication charge increases and the processing load of the center increases. As a result, system costs increase.

An object of the invention is to provide a driving evaluation system and an in-vehicle device capable of reducing the amount of communication data from a vehicle to the center.

Solution to Problem

According to an aspect of the invention, there is provided a driving evaluation system that divides a traveling route of a vehicle into a plurality of sections and evaluates the driving of a driver of the vehicle. The driving evaluation system includes: a driving data acquiring unit that acquires driving data of the driver for each section; a determining unit that determines whether the driving data acquired by the driving data acquiring unit satisfies evaluation conditions set to each section; and an upload unit that uploads the driving data to a center which evaluates driving when the determining unit determines that the driving data satisfies the evaluation conditions.

In the driving evaluation system according to the invention, the driving data of the driver is acquired for each section of the traveling route of the vehicle. When the driving data satisfies the evaluation conditions set to each section, the driving data is uploaded to the center. Therefore, the driving data for the entire traveling section of the vehicle is not uploaded. As a result, it is possible to reduce the amount of communication data from the vehicle to the center.

The driving evaluation system may further include a reference data setting unit that sets reference data for each section which is used to evaluate the driving data. The determining unit may determine whether a difference between the driving data and the reference data is beyond a predetermined range, and the upload unit may upload the driving data to the center when the determining unit determines that the difference between the driving data and the reference data is beyond the predetermined range. In this case, only when the difference between the driving data and the reference data is beyond the predetermined range, the driving data is uploaded to the center. Therefore, it is possible to reliably reduce the amount of communication data from the vehicle to the center.

The reference data setting unit may set, as the reference data, the driving data obtained during the first traveling of the vehicle along the traveling route. In this case, it is possible to simply set the reference data using only the driving data of the liver of the vehicle to be evaluated.

In this case, the driving evaluation system may further include a reference data change unit that changes the reference data. During the second or subsequent traveling of the vehicle along the traveling route, when the driving data different from that during the first traveling of the vehicle along the traveling route is obtained a plurality of times, the reference data change unit may change the reference data to the different driving data. In this case, typical driving data, not atypical driving data, is set as the reference data. Therefore, it is possible to set accurate reference data for the driver of the vehicle. As a result, it is possible to reduce the amount of communication data from the vehicle to the center.

The reference data setting unit may include a unit that acquires the driving data of a plurality of drivers who drive the same type of vehicle in the center and a unit that generates the reference data on the basis of the driving data of the plurality of drivers and transmits the reference data from the center to the vehicle. For example, when the vehicle is used on a holiday, in many cases, the driver drives a long distance along a traveling route which the driver has never driven. As such, even during the first traveling of the vehicle along the traveling route, the reference data for the traveling route is transmitted from the center to the vehicle and it is possible to determine whether the difference between the driving data and the reference data is beyond the predetermined range. Therefore, during the first traveling of the vehicle along the traveling route, it is possible to reduce the amount of communication data from the vehicle to the center.

According to another aspect of the invention, there is provided an in-vehicle device provided in a driving evaluation system that divides a traveling route of a vehicle into a plurality of sections and evaluates the driving of a driver of the vehicle. The in-vehicle device includes: a driving data acquiring unit that acquires driving data of the driver for each section; a determining unit that determines whether the driving data acquired by the driving data acquiring unit satisfies evaluation conditions set to each section; and an upload unit that uploads the driving data to a center which evaluates driving when the determining unit determines that the driving data satisfies the evaluation conditions.

As such, in the in-vehicle device according to the invention, the driving data of the driver is acquired for each section of the traveling route of the vehicle. When the driving data satisfies the evaluation conditions set to each section, the driving data is uploaded to the center. Therefore, the driving data for the entire traveling section of the vehicle is not uploaded. As a result, it is possible to reduce the amount of communication data from the vehicle to the center.

Advantageous Effects of Invention

According to the invention, it is possible to reduce the amount of communication data from the vehicle to the center. Therefore, it is possible to reduce a communication charge and reduce the processing load of the center. As a result, it is possible to reduce system costs.

BRIEF DESCRIPTION OF DRAWINGS

FIG. 4 is a diagram illustrating an example of a fuel efficiency value and reference data when a vehicle travels along a traveling route.

DESCRIPTION OF EMBODIMENTS

Hereinafter, a driving evaluation system and an in-vehicle device according to exemplary embodiments of the invention will be described in detail with reference to the accompanying drawings.

Figure 1:
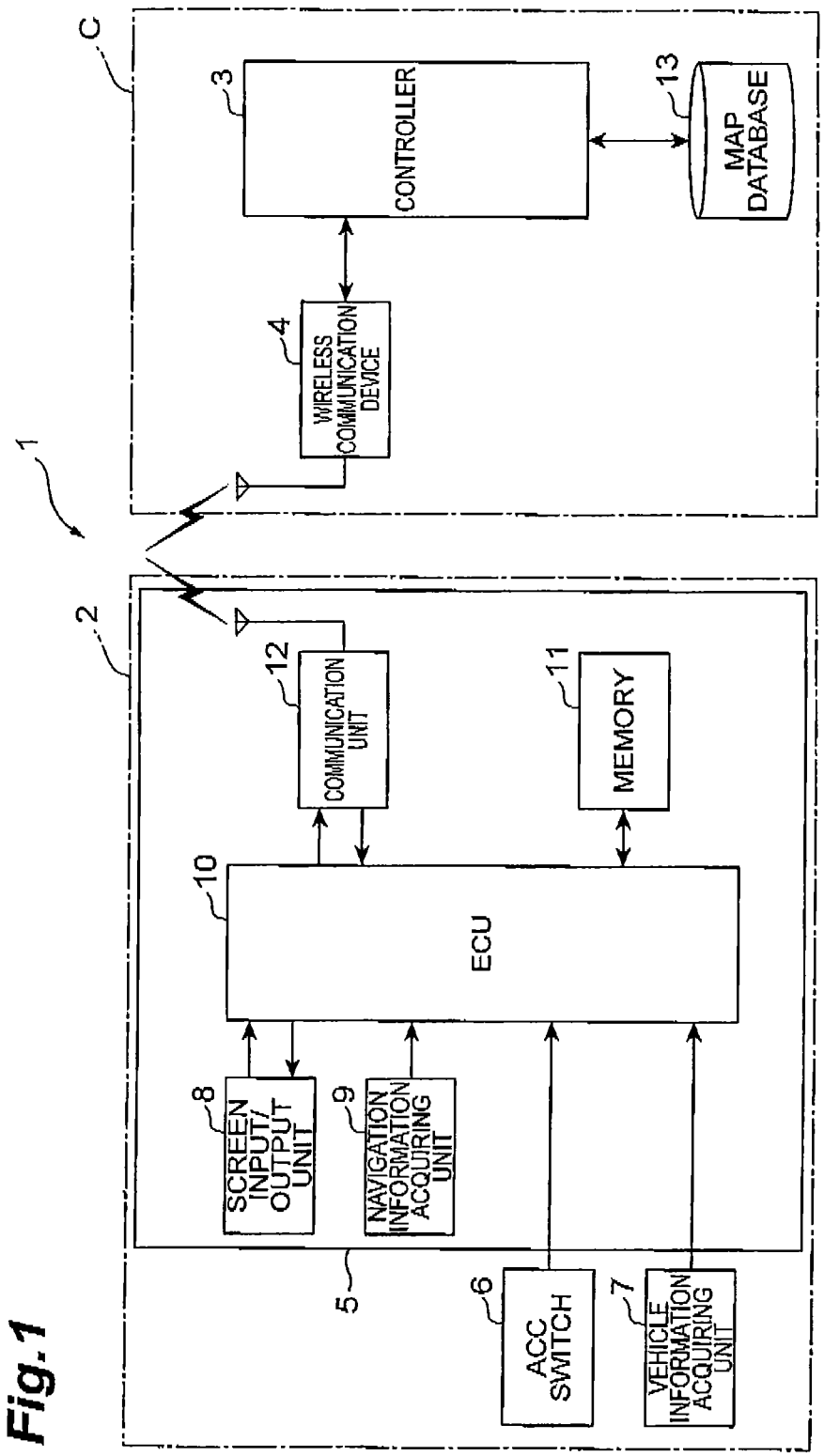
FIG. 1 is a system configuration diagram schematically illustrating a driving evaluation system according to a first embodiment of the invention.

FIG. 1 is a system configuration diagram schematically illustrating a driving evaluation system according to a first embodiment of the invention. In FIG. 1, a driving evaluation system 1 according to this embodiment is a system that evaluates the eco-driving of the driver of the vehicle. The driving evaluation system 1 includes an in-vehicle device 2 that is provided in the vehicle, and a controller 3 and a wireless communication device 4 that are provided in a center C.

The in-vehicle device 2 includes a navigation unit 5, an ACC (accessory) switch 6, and a vehicle information acquiring unit 7. The vehicle information acquiring unit 7 acquires vehicle information using, for example, a CAN (Controller Area Network) bus. Examples of the vehicle information include the amount of fuel consumption, the distance traveled, an accelerator opening angle, a vehicle speed, acceleration and deceleration, and a stoppage time.

The navigation unit 5 includes a screen input/output unit 8, such as a touch display, a navigation information acquiring unit 9, an ECU (Electronic Control Unit) 10, a memory 11, and a communication unit 12.

The screen input/output unit 8 has a screen input function for setting and inputting, for example, the destination of the vehicle and a screen output function for displaying information such as traveling route guidance information. The screen input/output unit 8 is not particularly limited to the touch display, but may be units with different screen input and output functions.

The navigation information acquiring unit 9 acquires navigation information for driving the vehicle to the destination along a traveling route. Examples of the navigation information include the link ID (Identification Data) of the traveling route, the current position (latitude and longitude) of the vehicle based on a GPS (Global Positioning System), day of the week, and time. The traveling route to the destination is divided into a plurality of sections (corresponding to link IDs).

The ECU 10 includes, for example, a CPU (Central Processing Unit), a memory, such as a ROM (Read Only Memory) or a RAM (Random Access Memory), and an input/output circuit. The ECU 10 receives the vehicle information acquired by the vehicle information acquiring unit 7 and the navigation information acquired by the navigation information acquiring unit 9, performs a predetermined process, and uploads traveling data (which will be described below) to the center C. The detailed process of the ECU 10 will be described below.

The memory 11 stores information such as the traveling data to be transmitted to the center C. The communication unit 12 wirelessly communicates with the wireless communication device 4 of the center C.

A map database 13 storing map information is connected to the controller 3 of the center C. The controller 3 registers the traveling data transmitted from the navigation unit 5 in the map database 13. The process of the controller 3 will be described in detail below.

Figure 2:
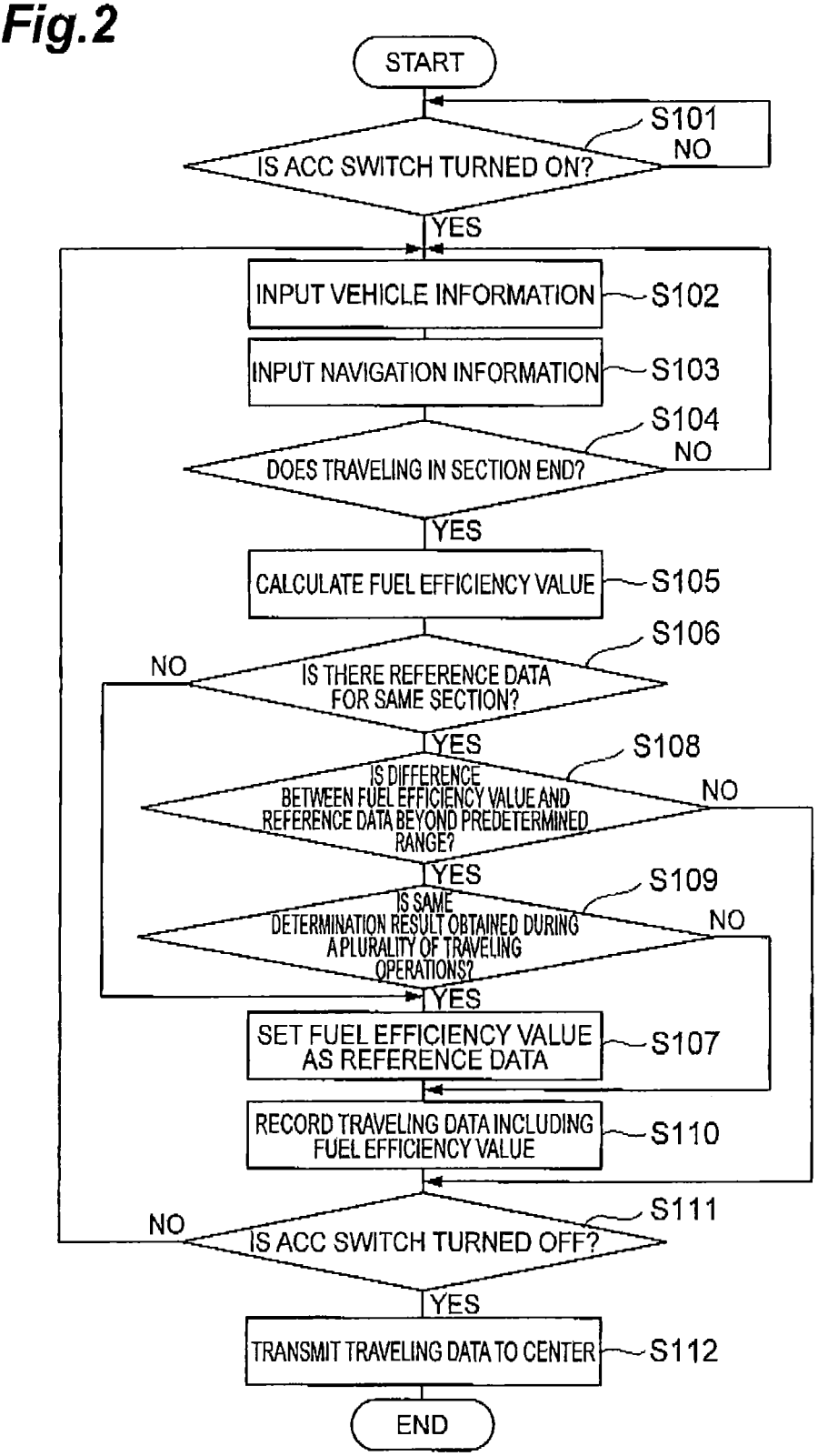
FIG. 2 is a flowchart illustrating the details of the process performed by an ECU of a navigation unit shown in FIG. 1.

FIG. 2 is a flowchart illustrating the details of the process performed by the ECU 10 of the navigation unit 5. In FIG. 2, first, it is determined whether the ACC switch 6 is turned on (Step S101). When the ACC switch 6 is turned on, the vehicle information acquired by the vehicle information acquiring unit 7 is input (Step S102). Then, the navigation information acquired by the navigation information acquiring unit 9 is input (Step S103).

Then, it is determined whether the traveling of the vehicle in one section ends (Step S104). In this case, the time when the link ID is changed is a criterion for determining the end of the traveling of the vehicle in the section. When the vehicle is traveling in one section, the process returns to Step S102. That is, while the vehicle is traveling in a predetermined section, the vehicle information and the navigation information are input at a predetermined sampling interval. When the traveling of the vehicle in one section ends, a fuel efficiency value during the traveling of the vehicle in the section is calculated from the amount of fuel consumption and the distance traveled which are included in the vehicle information (Step S105).

Then, it is determined whether there is reference data for the same section as described above (the section in which the fuel efficiency value is calculated) (Step S106). The reference data is a reference value of fuel efficiency value set to each section. When there is no reference data for the same section as described above, the fuel efficiency value acquired in Step S105 is set as the reference data for the section (Step S107). In this case, a plurality of reference data items may be set to the same section, hourly or daily, considering the road conditions.

When there is reference data for the same section as described above, it is determined whether the difference between the fuel efficiency value acquired in Step S105 and the reference data is beyond a predetermined range (for example, a range off ±10% of the reference data), that is, whether the difference between the fuel efficiency value and the reference data is greater than an upper limit threshold value (for example, a value of +10% of the reference data) or less than a lower limit threshold value (for example, a value of −10% of the reference data) (Step S108).

When the difference between the fuel efficiency value and the reference data is beyond the predetermined range, it is determined whether the same fuel efficiency value as that when the vehicle traveled in the section n times (n≥1) in the past is obtained, that is, whether the same fuel efficiency value is consecutively obtained a plurality of times including the current time (Step S109). When the same fuel efficiency value as that when the vehicle traveled in the section n times in the past is obtained, the fuel efficiency value is set as the reference data for the current section in which the vehicle travels (Step S107). In this case, a plurality of reference data items may be set to the same section hourly or daily.

Then, the traveling data including the fuel efficiency value (eco-drive data) calculated in Step S105 is stored in the memory 11 (Step S110). The traveling data includes the current position of the vehicle and driving operation information (for example, an accelerator opening angle, a vehicle speed, acceleration and deceleration, and a stoppage time as vehicle information) as information attached to the fuel efficiency value. When it is determined that in Step S109 the same fuel efficiency value as that when the vehicle traveled in the section n times in the past is not obtained, Step S107 is omitted and Step S110 is performed.

After Step S110 is performed or when it is determined in Step S108 that the difference between the fuel efficiency value and the reference data is not beyond the predetermined range, it is determined whether the ACC switch 6 is turned off (Step S111). When the ACC switch 6 is not turned off, the process returns to Step S102. When the ACC switch 6 is turned off, the traveling data for each section of the traveling route which is stored in the memory 11 is transmitted to the center C through the communication unit 12 (Step S112).

Figure 3:
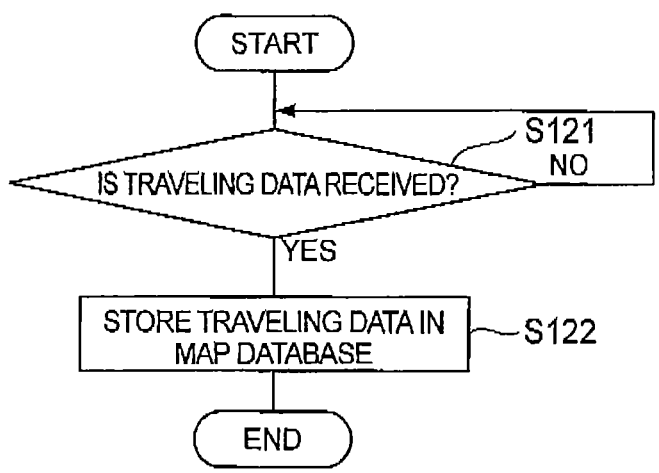
FIG. 3 is a flowchart illustrating the process performed by a controller of a center shown in FIG. 1.

FIG. 3 is a flowchart illustrating the process performed by the controller 3 of the center C. In FIG. 3, first, it is determined whether the traveling data for each section of the traveling route which is transmitted from the navigation unit 5 is received through the wireless communication device 4 (Step S121). When the traveling data for each section of the traveling route is received, the traveling data is stored in the map database 13 (Step S122).

The Steps S102 to S105 performed by the vehicle information acquiring unit 7, and the navigation information acquiring unit 9 and the ECU 10 of the navigation unit 5 form a driving data acquiring unit that acquires the driving data of the driver for each section. Step S108 performed by ECU 10 forms a determining unit that determines whether the driving data acquired by the driving data acquiring unit satisfies the evaluation conditions which are set to each section. Steps S110 and S112 performed by the ECU 10 and the communication unit 12 form an upload unit that uploads the driving data to the center C when the determining unit determines that the driving data satisfies the evaluation conditions.

Steps S106 and S107 performed by the ECU 10 form a reference data setting unit that sets the reference data for each section which is used to evaluate the driving data. Steps S109 and S107 performed by the ECU 10 form a reference data change unit that changes the reference data.

Next, the operation of this embodiment will be described with reference to FIG. 4. In FIG. 4, the traveling route of the vehicle is divided into sections A to E.

During the first traveling of the vehicle along the traveling route, all of the fuel efficiency values for the sections A to E are set as the reference data since there is no reference data. All of the traveling data including the fuel efficiency values is transmitted to the center C.

During the second traveling of the vehicle along the traveling route, the fuel efficiency values for the sections A to E are compared with the reference data which is set during the first traveling. In this case, since the difference between the reference data and the fuel efficiency value in the sections A, D, and E is within the predetermined range (a range of ±10% of the reference data), the fuel efficiency values for the sections A, D, and E are not transmitted to the center C. Since the difference between the reference data and the fuel efficiency value in the sections B and C is beyond the predetermined range, the fuel efficiency values for the sections B and C are transmitted to the center C.

During the third traveling of the vehicle along the traveling route, the fuel efficiency values for the sections A to E are compared with the reference data which is set during the first traveling. In this case, since the difference between the reference data and the fuel efficiency value in the sections A, B, D, and E is within the predetermined range, the fuel efficiency values for the sections A, B, D, and E are not transmitted to the center C. Since the difference between the reference data and the fuel efficiency value in the section C is beyond the predetermined range, the fuel efficiency value for the section C is transmitted to the center C.

Then, during the n-th traveling of the vehicle along the traveling route, the fuel efficiency values for the sections A to E are compared with the reference data which is set during the first traveling. In this case, only the difference between the reference data and the fuel efficiency value in the section C is beyond the predetermined range. The fuel efficiency value for the section C is equal to those during the second traveling and the third traveling. Therefore, it is assumed that the initially set reference data for the section C is not suitable for the driving of the driver or road conditions and the fuel efficiency value for the section C is set as new reference data.

As described above, in this embodiment, the fuel efficiency value for each section of the traveling route is compared with the reference data. When the difference between the reference data and the fuel efficiency value is beyond a predetermined range, the traveling data including the fuel efficiency value is uploaded to the center C. When the difference between the reference data and the fuel efficiency value is not beyond the predetermined range, the traveling data including the fuel efficiency value is not uploaded to the center C. As such, since the traveling data is selectively uploaded to the center C, it is possible to reduce the amount of communication data to the center C, as compared to a case in which all of the traveling data in one trip (for the period from the on state to the off state of the ACC switch 6) is transmitted to the center C. Therefore, it is possible to reduce a communication charge. In addition, when the center C treats the traveling data as statistical data, it is possible to reduce a processing load and thus reduce system costs.

When the vehicle travels in the same section several times and a plurality of consecutive fuel efficiency values different from the initially set reference data are obtained, the reference data is changed to the fuel efficiency value. Therefore, the reference data suitable for the driving of the driver or the road conditions is set. Therefore, it is possible to further reduce the amount of communication data to the center C.

Since the current position of the vehicle is included in the traveling data, the center C can determine the section of the traveling route in which the driver focuses efforts on eco-driving. In addition, since the driving operation information is included in the traveling data, it is easy for the center C to specify factors when the difference between the reference data and the fuel efficiency value is beyond the predetermined range.

Figure 5:
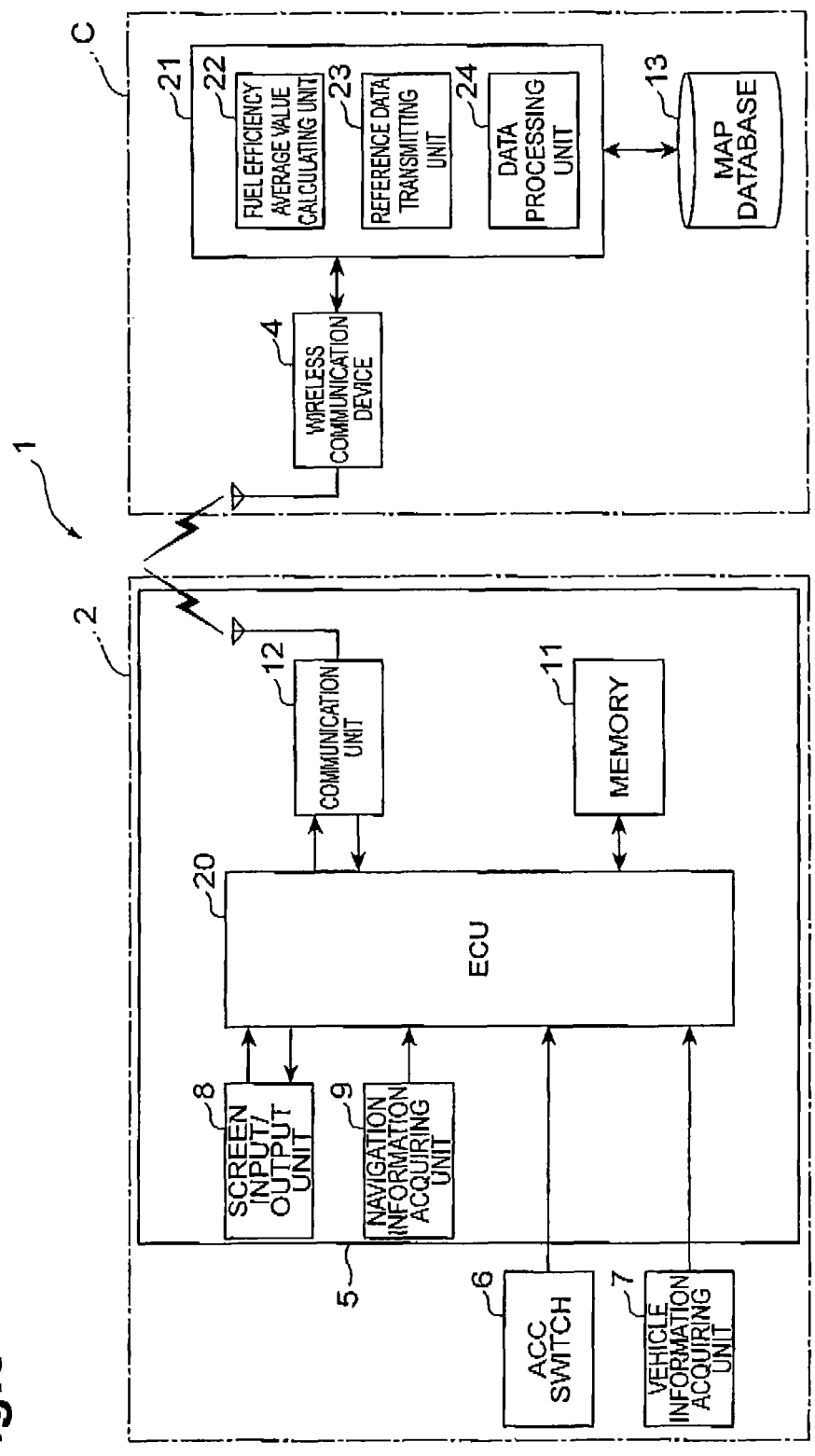
FIG. 5 is a system configuration diagram schematically illustrating a driving evaluation system according to a second embodiment of the invention.

FIG. 5 is a system configuration diagram schematically illustrating a driving evaluation system according to a second embodiment of the invention. In FIG. 5, the same or similar components as those in the first embodiment are denoted by the same reference numerals and the description thereof will not be repeated.

In FIG. 5, a navigation unit 5 of an in-vehicle device 2 includes an ECU 20, instead of the ECU 10. The process of the ECU 20 will be described in detail below. The center C includes a controller 21, instead of the controller 3. The controller 21 includes a fuel efficiency average value calculating unit 22, a reference data transmitting unit 23, and a data processing unit 24.

The fuel efficiency average value calculating unit 22 aggregates the traveling data of a plurality of drivers and calculates the average value of the fuel efficiency of the vehicle, which is driven by each driver who drives the same type of vehicle, for each section. The reference data transmitting unit 23 generates reference data for each section of the traveling route on the basis of the average value of the fuel efficiency for each section which is calculated by the fuel efficiency average value calculating unit 22 and transmits the reference data to the in-vehicle device 2 of the corresponding vehicle. The process of the fuel efficiency average value calculating unit 22 and the reference data transmitting unit 23 will be described in detail below.

The data processing unit 24 performs a process of registering the traveling data transmitted from the in-vehicle device 2 in a map database 13. This process is performed according to the sequence shown in FIG. 3.

Figure 6:
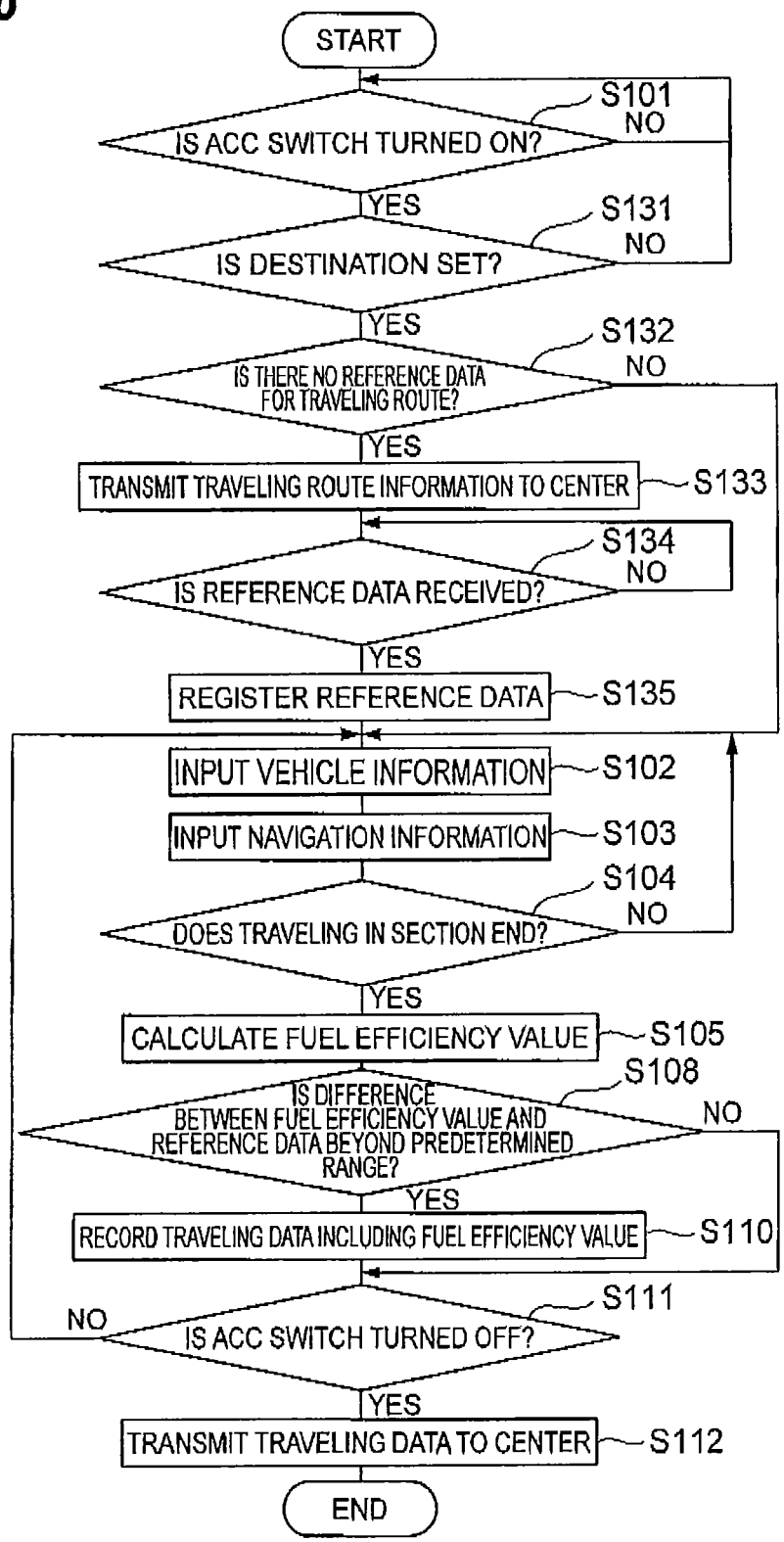
FIG. 6 is a flowchart illustrating the details of the process performed by an ECU of a navigation unit shown in FIG. 5.

FIG. 6 is a flowchart illustrating the details of the process performed by the ECU 20 of the navigation unit 5. In FIG. 6, when an ACC switch 6 is turned on in Step S101, it is determined whether a destination is set by a screen input/output unit 8 (Step S131). When the destination is set, it is determined whether the reference data for each section of the traveling route to the destination is registered in the memory 11 (Step S132).

When the reference data for each section of the traveling route is registered in the memory 11, the process proceeds to Step S102. When the reference data for each section of the traveling route is not registered in the memory 11, information about the traveling route is transmitted to the center C through a communication unit 12 (Step S133).

Then, it is determined whether the reference data for each section of the traveling route which is transmitted from the center C is received (Step S134). When the reference data for each section of the traveling route is received, the reference data is registered in the memory 11 (Step S135) and the process proceeds to Step S102. Steps S102 to S105 are the same as those in the flowchart shown in FIG. 2.

When it is determined in Step S108 that the difference between the fuel efficiency value and the reference data is beyond a predetermined range, the traveling data including the fuel efficiency value (eco-drive data) obtained in Step S105 is registered in the memory 11 (Step S110) and the process proceeds to Step S111. When it is determined that the difference between the fuel efficiency value and the reference data is not beyond the predetermined range, Step S110 is omitted and the process proceeds to Step S111. Then, Step S112 is performed.

Figure 7:
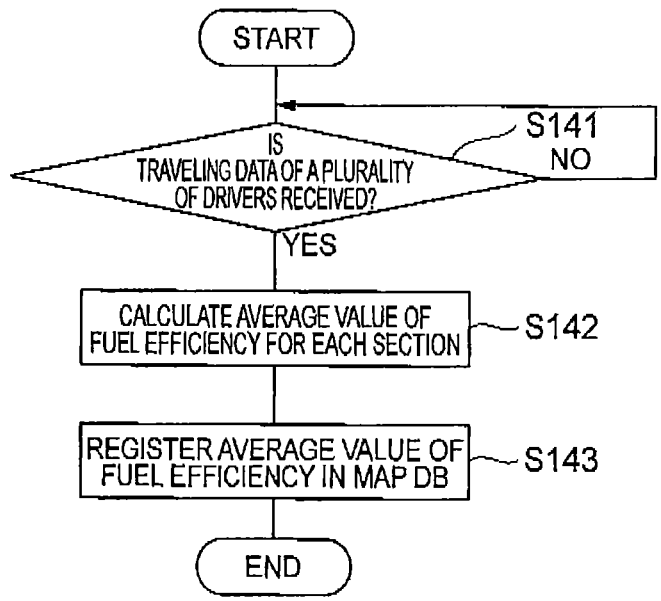
FIG. 7 is a flowchart illustrating the process performed by a fuel efficiency average value calculating unit of a controller shown in FIG. 5.

FIG. 7 is a flowchart illustrating the process performed by the fuel efficiency average value calculating unit 22. In FIG. 7, first, it is determined whether the traveling data of a plurality of drivers (users) which is transmitted from a plurality of vehicles is received (Step S141).

When the traveling data of the plurality of drivers is received, the average value of the fuel efficiency of the vehicle, which is driven by each driver who drives the same type of vehicle, for each section is calculated (Step S142). In this case, the average value of the fuel efficiency of the vehicle driven by each driver may be aggregated hourly or daily.

Then, the average value of the fuel efficiency of the vehicle driven by each driver is registered in the map database 13 (Step S143). In order to respond to a change in road conditions, such as a change in the traffic flow due to the opening of new facilities, the average value of the fuel efficiency of the vehicle driven by each driver which is registered in the map database 13 may be periodically updated.

Figure 8:
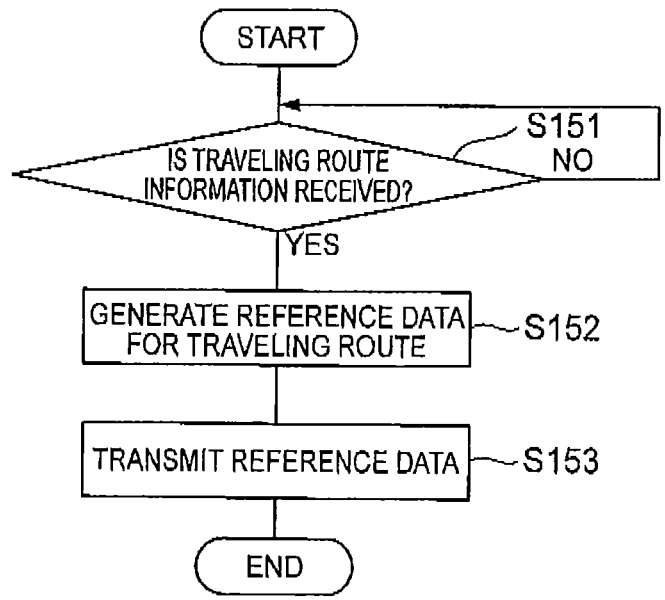
FIG. 8 is a flowchart illustrating the process performed by a reference data transmitting unit of the controller shown in FIG. 5.

FIG. 8 is a flowchart illustrating the process performed by the reference data transmitting unit 23. In FIG. 8, first, it is determined whether the information about the traveling route which is transmitted from the in-vehicle device 2 is received through a wireless communication device 4 (Step S151).

When the information about the traveling route is received, the average value of the fuel efficiency of the vehicle, which is driven by each driver who drives the same type of vehicle as that provided with the in-vehicle device 2, for each section of the traveling route is extracted from the map database 13 and reference data for the traveling route is generated (Step S152). In this case, the reference data may be generated hourly or daily. Then, the reference data for the traveling route is transmitted to the in-vehicle device 2 through the wireless communication device 4 (Step S153).

As described above, Steps S102 to S105 performed by the vehicle information acquiring unit 7, and the navigation information acquiring unit 9 and the ECU 20 of the navigation unit 5 form a driving data acquiring unit that acquires the driving data of the driver for each section. Step S108 performed by the ECU 20 forms a determining unit that determines whether the driving data acquired by the driving data acquiring unit satisfies the evaluation conditions set to each section. Steps S110 and S112 performed by the ECU 20 and the communication unit 12 form an upload unit that uploads the driving data to the center C when the determining unit determines that the driving data satisfies the evaluation conditions.

The fuel efficiency average value calculating unit 22 and the reference data transmitting unit 23 of the controller 21 and the wireless communication device 4 form a reference data setting unit that sets the reference data for each section which is used to evaluate the driving data.

Figure 9:
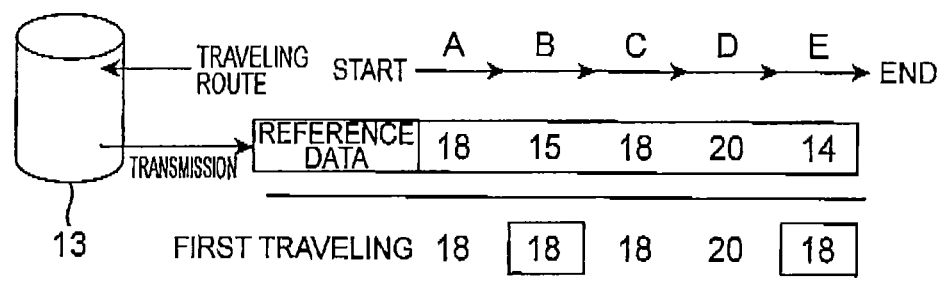
FIG. 9 is a diagram illustrating an example of reference data for a traveling route transmitted from the center and a fuel efficiency value when the vehicle travels along the traveling route.

Next, the operation of this embodiment will be described with reference to FIG. 9. In FIG. 9, the traveling route of the vehicle is divided into sections A to E.

First, the driver of the vehicle sets a destination using the screen input/output unit 8 of the navigation unit 5. In this case, when the reference data for each section of the traveling route to the destination is not registered in the memory 11, information about the traveling route is transmitted to the center C. When the controller 21 of the center C receives the information about the traveling route, reference data for the traveling route is generated and is then transmitted from the controller 21 to the in-vehicle device 2. When the ECU 20 of the navigation unit 5 receives the reference data for the traveling route, the reference data is registered in the memory 11. Therefore, as shown in FIG. 9, the in-vehicle device 2 has the reference data for the sections A to E.

During the first traveling of the vehicle along the traveling route, the fuel efficiency values for the sections A to E are compared with the reference data. In this case, since the difference between the reference data and the fuel efficiency value in the sections A, C, and D is within a predetermined range (a range of ±10% of the reference data), the fuel efficiency values for the sections A, C, and D are not transmitted to the center C. Since the difference between the reference data and the fuel efficiency value in the sections B and E is beyond the predetermined range, the fuel efficiency values for the sections B and E are transmitted to the center C.

As described above, in this embodiment, when the destination is set and there is no reference data for each section of the traveling route, the center C transmits the reference data for the traveling route to the in-vehicle device 2. Therefore, even for the traveling route along which the vehicle travels first, the fuel efficiency value is compared with the reference data. Only when the difference between the reference data and the fuel efficiency value is beyond a predetermined range, the traveling data can be uploaded to the center C. In this way, even during the first traveling of the vehicle along the traveling route, it is possible to reduce the amount of communication data to the center C.

In this embodiment, the average value of the fuel efficiency of the vehicle which is driven by each driver who drives the same type of vehicle is calculated to generate the reference data. For example, the reference data may be set for the purpose of use.

The driving evaluation system and the in-vehicle device according to the exemplary embodiments of the invention have been described above, but the invention is not limited to the above-described embodiments.

Figure 10:
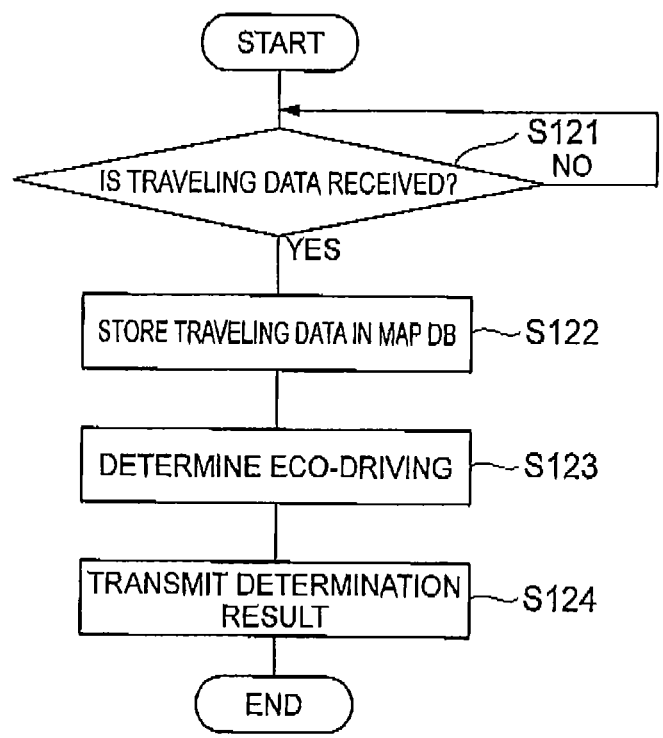
FIG. 10 is a flowchart illustrating a modification of the flowchart shown in FIG. 3.

For example, the controller 3 of the center C may evaluate eco-driving on the basis of the traveling data transmitted from the in-vehicle device 2. FIG. 10 shows a modification of the flowchart shown in FIG. 3 and is a flowchart illustrating the process of a controller 3 with an eco-driving evaluation function.

In FIG. 10, after Step S122 is performed, it is determined whether eco-driving can be performed (Step S123). For example, when the fuel efficiency value is more than the reference data, it is determined that eco-driving can be performed and driving advice for the driver is not needed. When the fuel efficiency value is less than the reference data, it is determined that eco-driving cannot be performed and driving advice for the driver is needed.

Then, the determination result in Step S123 is transmitted to the in-vehicle device 2 through the wireless communication device 4 (Step S124). Information transmitted to the in-vehicle device 2 is displayed on the screen input/output unit 8 of the navigation unit 5. In this way, the driver can immediately know the evaluation result of eco-driving.

Specifically, when it is determined that eco-driving can be performed, a notice indicating that eco-driving can be performed is transmitted to the in-vehicle device 2. When the fuel efficiency value reaches a given level, a notice indicating that the level has been up may be transmitted to the in-vehicle device 2 to prompt the driver to continuously perform eco-driving or to motivate the driver. When it is determined that eco-driving cannot be performed, the section in which eco-driving cannot be performed is specified and data for detailed driving advice is transmitted to the in-vehicle device 2. In this case, for example, an accelerator opening angle can be compared with data of another person to give the appropriate driving advice. When the fuel efficiency value is reduced to a given level, a notice indicating that the level has been down may be transmitted to the in-vehicle device 2 to prompt the driver to improve eco-driving or to motivate the driver.

Figure 11:
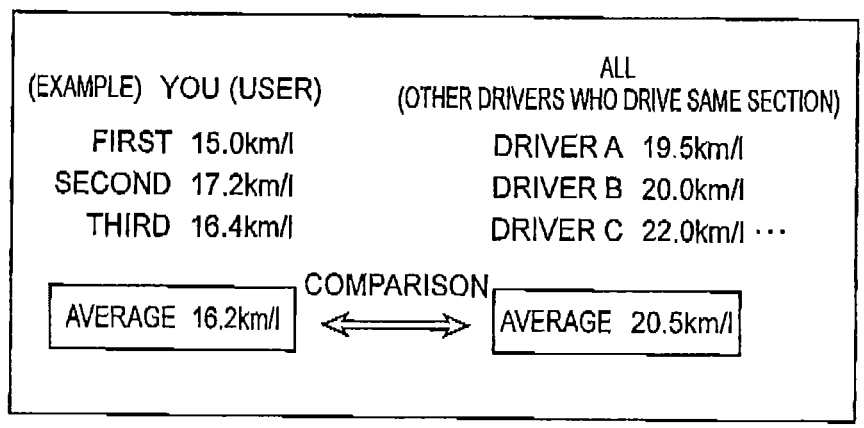
FIG. 11 is a diagram illustrating an example in which the average value of the fuel efficiency value of the vehicle driven by a driver is compared with the fuel efficiency value of the vehicle driven by other model drivers and the comparison result is displayed on a screen input/output unit of a navigation unit.
Figure 11:
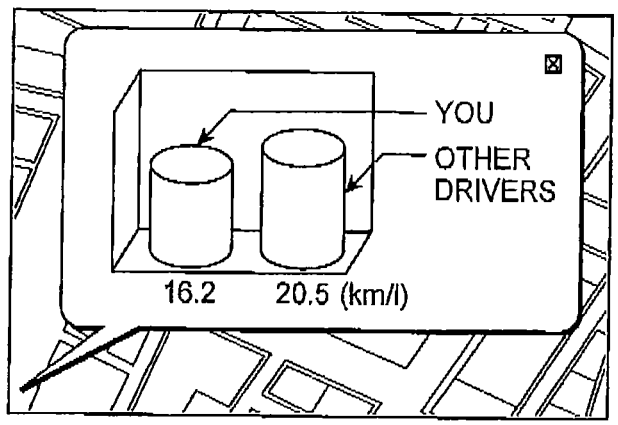

In addition, the traveling data of the vehicle driven by the driver who performs eco-driving may be stored in the center C and then used as the model data of another driver. In this case, for example, as shown in FIG. 11(a), the average value of the fuel efficiency value of the vehicle driven by the driver may be compared with the fuel efficiency value of the vehicle driven by other model drivers who drive the vehicle in the same section and the comparison result may be transmitted to the in-vehicle device 2. Then, as shown in FIG. 11(b), the comparison result may be displayed on the screen input/output unit 8 of the navigation unit 5.

In the second embodiment, when there is no reference data for the traveling route to the destination in the in-vehicle device 2, information about the traveling route is transmitted to the center C and the reference data for the traveling route is transmitted from the center C to the in-vehicle device 2. However, the invention is not particularly limited to this method. For example, when the navigation unit 5 is shipped, reference data for a plurality of traveling routes may be generated on the basis of the traveling data for all vehicles which is stored in the center C and then transmitted to the in-vehicle device 2 provided with the navigation unit 5. In this case, it is possible to reduce the amount of communication data to the center C when the service starts.

In the above-described embodiments, when the difference between the reference data and the fuel efficiency value is beyond the predetermined range, the traveling data including the fuel efficiency value is uploaded to the center C. However, the invention is not particularly limited to this method. For example, only when the fuel efficiency value is less than the lower limit threshold value, the traveling data including the fuel efficiency value may be uploaded to the center C.

In the above-described embodiments, the in-vehicle device 2 is configured such that the traveling data is uploaded for each trip in which the ACC switch is changed from the on state to the off state. However, the in-vehicle device 2 may be configured such that the traveling data is periodically uploaded a plurality of times during one trip.

In the above-described embodiments, the driving of the driver is evaluated on the basis of the amount of fuel consumption of the vehicle having gasoline as an energy source. However, the driving evaluation system and the in-vehicle device according to the invention can also be applied to a case in which the driving of the driver is evaluated on the basis of the amount of electricity consumption of a vehicle having a battery as an energy source.

Reference Signs List

1: DRIVING EVALUATION SYSTEM
2: IN-VEHICLE DEVICE
3: CONTROLLER
4: WIRELESS COMMUNICATION DEVICE (REFERENCE DATA SETTING UNIT)
5: NAVIGATION UNIT
7: VEHICLE INFORMATION ACQUIRING UNIT (DRIVING DATA ACQUIRING UNIT)
9: NAVIGATION INFORMATION ACQUIRING UNIT (DRIVING DATA ACQUIRING UNIT)
10: ECU (DRIVING DATA ACQUIRING UNIT, DETERMINING UNIT, UPLOAD UNIT, REFERENCE DATA SETTING UNIT, REFERENCE DATA CHANGE UNIT)
12: COMMUNICATION UNIT (UPLOAD UNIT)
20: ECU (DRIVING DATA ACQUIRING UNIT, DETERMINING UNIT, UPLOAD UNIT)
21: CONTROLLER

22: FUEL EFFICIENCY AVERAGE VALUE CALCULATING UNIT (REFERENCE DATA SETTING UNIT)
23: REFERENCE DATA TRANSMITTING UNIT (REFERENCE DATA SETTING UNIT)
C: CENTER

The invention claimed is:

1. A driving evaluation system that divides a traveling route of a vehicle into a plurality of sections and evaluates the driving of a driver of the vehicle, comprising:
   an in-vehicle device that is provided in the vehicle;
   a device that is provided in a center in order to evaluate the driving of the driver of the vehicle;
   a driving data acquiring unit that acquires driving data of the driver for each section;
   a determining unit that determines whether the driving data acquired by the driving data acquiring unit satisfies evaluation conditions which are set to each section and are related to an amount of fuel consumption or an amount of electricity consumption; and
   an upload unit that uploads the driving data which is determined to satisfy the evaluation conditions from the in-vehicle device to the center which evaluates driving when the determining unit determines that the driving data satisfies the evaluation conditions.

2. The driving evaluation system according to claim 1, further comprising:
   a reference data setting unit that sets reference data for each section which is used to evaluate the driving data,
   wherein the determining unit determines whether a difference between the driving data and the reference data is beyond a predetermined range, and
   the upload unit uploads the driving data which is determined to exceed the predetermined range to the center when the determining unit determines that the difference between the driving data and the reference data is beyond the predetermined range.

3. The driving evaluation system according to claim 2,
   wherein the reference data setting unit sets, as the reference data, the driving data obtained during the first traveling of the vehicle along the traveling route.

4. The driving evaluation system according to claim 3, further comprising:
   a reference data change unit that changes the reference data,
   wherein, during the second or subsequent traveling of the vehicle along the traveling route, when the same driving data different from that obtained during the first traveling of the vehicle along the traveling route is obtained a plurality of times, the reference data change unit changes the reference data to the same driving data.

5. The driving evaluation system according to claim 2,
   wherein the reference data setting unit includes a unit that acquires the driving data of a plurality of drivers who drive the same type of vehicle in the center and a unit that generates the reference data on the basis of the driving data of the plurality of drivers and transmits the reference data from the center to the vehicle.

6. An in-vehicle device provided in a driving evaluation system that divides a traveling route of a vehicle into a plurality of sections and evaluates the driving of a driver of the vehicle, comprising:
   a driving data acquiring unit that acquires driving data of the driver for each section;
   a determining unit that determines whether the driving data acquired by the driving data acquiring unit satisfies evaluation conditions which are set to each section and are related to an amount of fuel consumption or an amount of electricity consumption; and
   an upload unit that uploads the driving data which is determined to satisfy the evaluation conditions to a center which evaluates driving of the driver when the determining unit determines that the driving data satisfies the evaluation conditions.

* * * * *